(12) United States Patent
Lin et al.

(10) Patent No.: US 9,475,982 B2
(45) Date of Patent: *Oct. 25, 2016

(54) MULTI-WAVELENGTH COMPOSITE LIGHT-STORING POWDER AND METHOD OF MANUFACTURING AND APPLYING THE SAME

(71) Applicant: TAIWAN TEXTILE RESEARCH INSTITUTE, New Taipei (TW)

(72) Inventors: Sheng-Jen Lin, New Taipei (TW); Ying-Hsiu Hsiao, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 600 days.

This patent is subject to a terminal disclaimer.

(21) Appl. No.: 13/946,146

(22) Filed: Jul. 19, 2013

(65) Prior Publication Data
US 2014/0319711 A1    Oct. 30, 2014

(30) Foreign Application Priority Data

Apr. 26, 2013  (TW) .............................. 102115121 A

(51) Int. Cl.
| | |
|---|---|
| C09K 11/02 | (2006.01) |
| C09K 11/77 | (2006.01) |
| D01F 1/10 | (2006.01) |
| D01D 5/08 | (2006.01) |

(52) U.S. Cl.
CPC .............. C09K 11/02 (2013.01); C09K 11/025 (2013.01); C09K 11/7734 (2013.01); D01F 1/10 (2013.01); D01D 5/08 (2013.01)

(58) Field of Classification Search
CPC . C09K 11/02; C09K 11/025; C09K 11/7734; D01F 1/10; D01D 5/08
See application file for complete search history.

(56) References Cited

U.S. PATENT DOCUMENTS

| | | | | |
|---|---|---|---|---|
| 2,643,198 A | * | 6/1953 | Savidge | ................... 252/301.21 |
| 2006/0145068 A1 | * | 7/2006 | Chen | ..................... H01J 49/164 |
| | | | | 250/282 |

FOREIGN PATENT DOCUMENTS

| | | |
|---|---|---|
| EP | 0728749 A2 | 8/1996 |
| EP | 1560274 A1 | 8/2005 |

(Continued)

OTHER PUBLICATIONS

Yu Shengfei, "Surface Patterning of Persistent Luminescent Hybrids Linked with Coordination Bond and Its Application", South China University of Technology, Guangzhou, China, Dec. 15, 2008.

*Primary Examiner* — Mathieu Vargot
(74) *Attorney, Agent, or Firm* — McClure, Qualey & Rodack, LLP

(57) ABSTRACT

A multi-wavelength composite light-storing powder and method of manufacturing and applying the same. It utilizes organic compound having double-imide-bond steric structure, to produce high speed collisions with light-storing material containing rare earth elements in an environment of extremely low temperature, to make collision surface produce instantaneous high temperature, so that the organic compound is sputtered onto a surface of the light-storing material. The surface is cooled instantly due to extremely low temperature to produce the composite light-storing powder. The composite light-storing powder is apt to engage cross linked structure of thermoplastic polymer in a high temperature blending process. Then, through a filament process, to produce successfully light-storing fiber capable of emitting multi-wavelengths with high heat resistance and wash endurance.

4 Claims, 4 Drawing Sheets

(56) References Cited

FOREIGN PATENT DOCUMENTS

| | | |
|---|---|---|
| JP | H07300722 A | 11/1995 |
| JP | 2002220516 A | 8/2002 |
| JP | 2007308862 A | 11/2007 |
| JP | 2010159318 A | 7/2010 |
| TW | 564268 | 12/2003 |
| TW | 201103971 A1 | 2/2011 |
| TW | I372176 | 9/2012 |

* cited by examiner

MULTI-WAVELENGTH COMPOSITE LIGHT-STORING POWDER AND METHOD OF MANUFACTURING AND APPLYING THE SAME

BACKGROUND OF THE INVENTION

1. Field of the Invention

The present invention relates to a light-storing material, and in particular to a multi-wavelength composite light-storing powder and method of manufacturing and applying the same, that is realized through using an organic compound of double-imide-bond steric structure.

2. The Prior Arts

Since the discovery of the long afterglow phenomenon in the early 20th century, the development of the light-storing material has progressed rapidly. Various light-storing materials are utilized extensively in the manufacturing of the light-storing objects. The light-storing material is able to emit specific lights after absorbing ultra-violet light or other radiations, and that is referred to as the fluorescence light or afterglow. The light-storing material can be made into light-storing fiber, that is able to absorb sun light, ultraviolet light in daytime, to store it as light energy, and in darkness or at night, it can give out lights of various colors. The costume made of light-storing fiber is colorful and glamorous, without the need to use dye. As such, it can avoid environment pollution, being non-toxic and un-harmful, having no radio-activity, thus fulfilling the requirement of environment protection.

With regard to the related patent case, Taiwan Patent No 564268 discloses "A night time high luminance fiber and method of manufacturing the same". Wherein, it provides a night time high luminance fiber, having the characteristics of long time high luminance multi-color emission, without causing harm to the human body, as such it can be used in embroidery and garments. The fiber is a kind of a shell and core type composite fiber, formed by polyester resin or polyolefin resin of night luminance pigment as its core, and polyester resin not containing the night luminance pigment as its shell. In contrast to the pure fiber, it contains night luminance pigment of 7 to 25 weight %, and one minute after termination of agitation, it can still retain residue luminance of over 500 mcd/m$^2$. For a single fiber, its thickness is below 40 µm.

In addition, Taiwan Patent No. 200927883 discloses a "Wash endurance light-storing masterbatch and fiber, and method of manufacturing the same". Wherein, it emphasizes the use of hydrophobic material, to mix it with light-emitting material such as aluminate salts having rare earth elements, to produce light-storing masterbatches. Then, it goes through a melting and spinning process, to form a shell and core type light-storing fiber. The use of hydrophobic material is to devoid the light-storing material in the light-storing fiber from the problem of hydrolysis due to moisture.

However, usually, the conventional light-storing fiber must use high contents of light-storing powder, about 30% by weight, thus it has the drawback of high production cost, monotonous emitted light color, and it can not be mass produced. Also, it has the problem of insufficient heat resistance for the spinning and yarning processes, and the fiber applying process does not have wash endurance, and can not withstand filament processing and rectification.

Therefore, there exists a need in the Industries to develop a light storing material that is heat resistant and wash endurant, and can be mass produced to emit lights of various colors, so as to achieve ideal light-storing fiber or fabric, to raise its application and competitiveness.

SUMMARY OF THE INVENTION

In view of the problem and drawbacks of the prior art, a major objective of the present invention is to produce a multi-wavelength composite light-storing powder, that can be upgraded from the prior art for the light-storing material containing rare earth elements and emitting monotonous green light wavelength, to the composite light-storing powder emitting warm color series light wavelength. As such, it is capable of raising application scope of the light-storing material and its added value.

Another objective of the present invention is to provide a multi-wavelength composite light-storing powder and method of manufacturing and applying the same, to enable the light-storing masterbatch and the light-storing fiber to produce lights of various colors other than the prior art, to raise the heat resistance and wash endurance of the light-storing fiber, so as to reduce Denier number and amount utilized.

In order to achieve the objective mentioned above, the present invention provides a multi-wavelength composite light-storing powder, composed of light-storing material containing rare earth elements, and organic compound having double-imide-bond steric structure. Wherein, the organic compound having double-imide-bond steric structure is formed and fused onto the surface of light-storing material containing rare earth elements, in a high speed gas flow, and in an environment of extremely low temperature −100 to −196° C. The organic compound having double-imide-bond steric structure on the surface of multi-wavelength composite light-storing powder could produce bond-twisting, that could lead to energy changes, to emit warm color series light wavelengths, including major peak yellow light wavelength of 620 nm, orange light wavelength of 680 nm, and pink light wavelength of 700 nm.

The present invention also provides a multi-wavelength composite light-storing powder manufacturing method, including the following steps. Firstly, provide light-storing material containing rare earth elements, and organic compound having double-imide-bond steric structure. Next, introduce a high speed gas flow, and in an environment of extremely low temperature −100 to −196° C., to make light-storing material containing rare earth elements, and organic compound having double-imide-bond steric structure to collide at high speed. Then, utilize the instantaneous high temperature produced by the collision, to sputter the organic compound having double-imide-bond steric structure onto the surface of light-storing material containing rare earth elements. Subsequently, the mixture thus obtained is cooled instantaneously by the environment of extremely low temperature, to form a multi-wavelength composite light-storing powder.

The present invention also provides a light-storing fiber manufacturing method, including the following steps. Firstly, mix the multi-wavelength composite light-storing powder of 1 to 30% by weight into a thermoplastic polymer of 50 to 95% by weight, a ring structure test agent having dipropylene and tripropylene functional groups of 0.05 to 5% by weight, a cross linking agent of 0.01 to 5% by weight, and a dispersing agent of 0.01 to 5% by weight, to obtain a mixed powder. Subsequently, put the mixed powder in a high temperature to melt and blend, so that the thermoplastic polymer is in a melted condition. Then, cross link the melted thermoplastic polymer, to make the composite light-storing powder to distribute evenly in the cross-linked thermoplastic polymer. Subsequently, bake to dry the cross linked thermoplastic polymer having the composite light-storing powder distributed therein, to obtain the light-storing masterbatches. Afterwards, perform spinning and filament process for the light-storing masterbatches, and to make the filaments curl into light-storing fibers. The production process described above can raise the heat resistance of the light-storing fiber, to produce successfully the light-storing filament fiber. As such, even after it being washed 50 times with water, it can still retain sufficient luminance. The light-storing fiber of the present invention can be used extensively in various Industries, such as the commodity industry, textile industry, indoor decoration products, and safety products.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a multi-wavelength composite light-storing powder, that is capable of producing warm color series light wavelength as distinguished from the green color light wavelength emitted by the light-storing material of the prior art, to produce light-storing fiber of various wavelengths through blending and spinning the light-storing masterbatch. In the following, refer to FIGS. 1 to 3, for detailed descriptions as to the approaches of producing multi-wavelength composite light-storing powder, and the ways of processing it into light-storing masterbatches and light-storing fiber.

Figure 1:
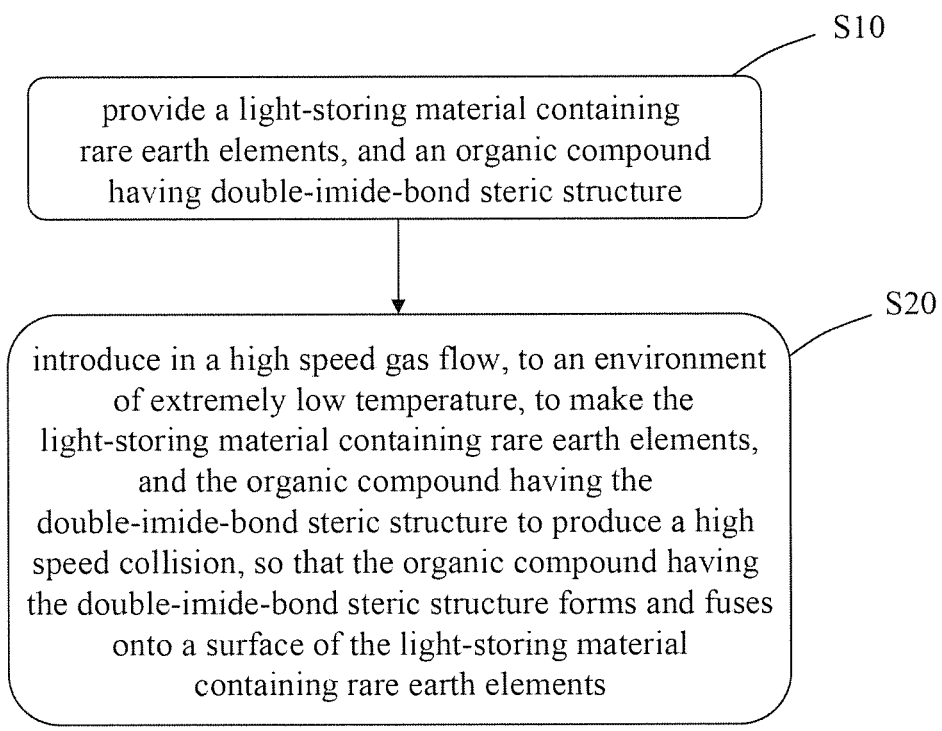
FIG. 1 is a flowchart of the steps of a multi-wavelength composite light-storing powder manufacturing method according to the present invention.

Refer to FIG. 1 for a flowchart of the steps of a multi-wavelength composite light-storing powder manufacturing method according to the present invention. As shown in FIG. 1, the method includes the following steps.

Firstly, as shown in step S10, provide light-storing material containing rare earth elements and organic compound having double-imide-bond steric structure of 0.01 to 5% by weight. Wherein, for the light-storing material containing the rare earth elements, $MAl_2O_4$: Eu,N can be selected to use; while for the organic compound having double-imide-bond steric structure, 4,4'-diamino-2,2'-stilbenedisulfonic acid can be selected to use.

Next, as shown in step S20, introduce high speed gas flow, such as 100% nitrogen, to establish an environment of relatively low temperature of −100 to −196° C., so that light-storing material containing rare earth elements is made to make high speed collisions with the organic compound having double-imide-bond steric structure. The instantaneous high temperature produced by the collision can make the organic compound having double-imide-bond steric structure to be sputtered onto the surface of light-storing material containing rare earth elements. Then, it can be cooled instantly due to the extremely low temperature of the environment, to produce multi-wavelength composite light-storing powder of pseudo shell and core structure.

The multi-wavelength composite light-storing powder emits fluorescence light photons after absorbing specific lights. In this process, the double-bond twisting produced by the organic compound having double-imide-bond steric structure on the surface of the powder could lead to changes of energy, so that the light emitted will produce Stokes Shift. As such, the peak green light wavelength of 565 nm emitted by the light-storing material of the prior art is shifted to yellow light wavelength of 620 nm, orange light wavelength of 680 nm, and pink light wavelength of 700 nm.

Figure 2:
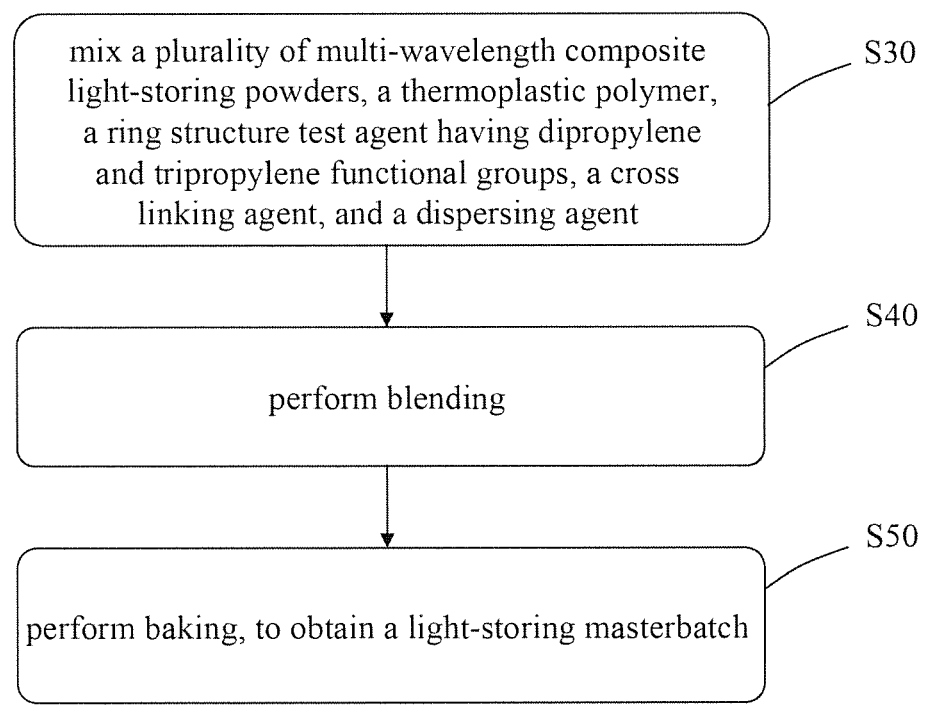
FIG. 2 is a flowchart of the steps of a light-storing masterbatch manufacturing method according to the present invention.

Refer to FIG. 2 for a flowchart of the steps of a light-storing masterbatch manufacturing method according to the present invention. As shown in FIG. 2, the method includes the following steps:

Firstly, refer to step S30, mix the multi-wavelength composite light-storing powder of 1 to 30% by weight into the dried thermoplastic polymer.

The amount of thermoplastic polymer utilized is 50 to 95% by weight, which can be selected from polyester powder, nylon powder, polyester particles, or nylon particles. Wherein the Intrinsic Viscosity (IV) of the polyester powder is 0.2 to 2.0; while the relative viscosity (RV) of the nylon powder is 2.0 to 5.0. Then, add in a ring structure test agent having a dipropylene and tripropylene functional group of 0.05 to 5% by weight, a cross linkage agent of 0.01 to 5% by weight, and a dispersing agent of 0.01 to 5% by weight, to mix them evenly into a mixed powder.

In the descriptions above, the ring structure test agent having dipropylene and tripropylene functional groups can be selected from one of a group consisting of: diallylphthalate, diallyl succinate, diallyl tartramide, triallyl amine, triallyl trimesate, 3-[(4-nitrophenyl)azo]-5-[(4-sodiosulfophenyl)azo]-2-hydroxybenzoic acid sodium salt, triallyl cyanurate, triallyl isocynaurate, 4-[[4-(aminocarbonyl)phenyl]azo]-N-(2-ethoxyphenyl)-3-hydroxynaphthalene-2-carboxamide, and triacryloylhexahydro-1,3,5-triazine. The dispersing agent can be selected from the long carbon chain Alkane dispersing agent, that for example can include wax.

Next, as shown in step S40, in a blending temperature of 180° C. to 260° C., melt and blend the mixed powder, to make the thermoplastic polymer in a melted condition. Through the cross linking reaction between the cross linking agent and the thermoplastic polymer, to make the composite light-storing powder distributed evenly in the cross-linked thermoplastic polymer.

Then, as shown in step S50, bake the cross linked thermoplastic polymer to dry in a temperature of 85° C., to obtain the light-storing masterbatch.

Figure 3:
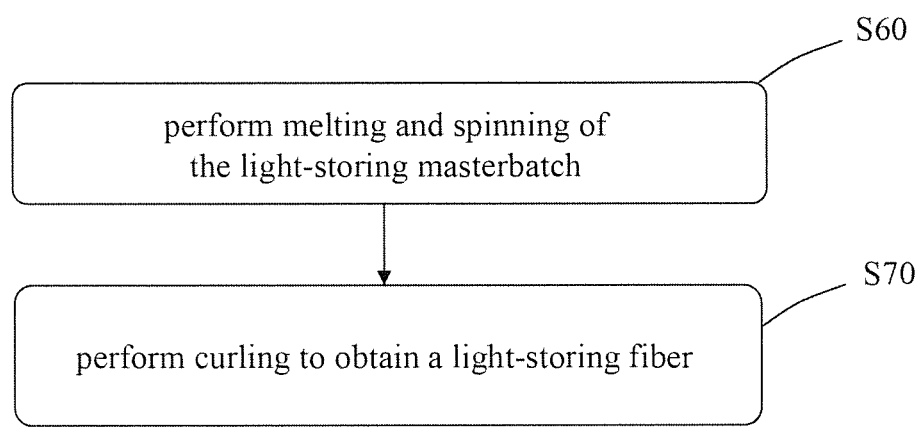
FIG. 3. is a flowchart of the steps of a light-storing fiber manufacturing method according to the present invention.

Refer to FIG. 3 for a flowchart of the steps of a light-storing fiber manufacturing method according to the present invention, comprising the following step.

Firstly, as shown in step S60, in a spinning temperature of 230 to 290° C., and at a spinning and curling speed of 1000 to 3000 m/min, perform melting and spinning of the light-storing masterbatch into filaments.

Finally, as shown in step S70, perform curling of the filaments into light-storing fibers. The thickness of the light-storing fiber can be from 20 to 30 μm, and it can be a single set original fiber, or a double set fiber of a shell and a core structure, such that the composite light-storing powder can be formed into the shell or core in a double set fiber of a shell and core structure.

In the following, a few embodiments (the first to third embodiment) are described to explain the approaches of manufacturing multi-wavelength composite light-storing powder, and the ways of processing it into light-storing masterbatches and light-storing fibers. Also, a comparison example is used to explain the objective, principle and effect of the present invention.

(1) Multi-Wavelength Composite Light-Storing Powder.

For the light-storing material powder containing rare earth elements and organic compound powder having double-imide-bond steric structure, introduce continuously liquid nitrogen, and in an extremely low temperature (−100 to −196° C.), and under the introduction of high speed gas flow, to make the two powders to collide with each other, to achieve a production rate of 100-500 kg/h. Due to the extremely low environment temperature, and the instant pulverization produced by the powder collision, the powder diameter can be reduced from 50 to 100 microns to below 1 to 5 microns. Also, due to the instantaneous heat produced by collisions between the two kinds of powders, plus the extremely low temperature of the environment, thus causing the light-storing material and the organic compound to form temporary or permanent fusion, to produce multi-wavelength composite light-storing powder. The twisting of the double-bond structure on its surface of the multi-wavelength composite light-storing powder, will cause variations of the wavelength of the emitted lights.

(2) Light-Storing Masterbatch

Continue the manufacturing process mentioned above, prepare composite light-storing powder of 10 to 25% by weight together with polyester (PBT) powder, then add a ring structure test agent having a dipropylene and a tripropylene functional group of 0.05 to 5% by weight, and a long carbon chain Alkane dispersing agent of 0.5 to 1.5% by weight, to blend them together. Then, add a light sensitive cross linking agent having 3 functional groups of 0 to 3.0% by weight, as shown in Table 1. Subsequently, use a double-axis blending machine to blend it into Light-Storing Masterbatch in a blending temperature of 180 to 260° C. Since light sensitive cross linking agent having 3 functional groups is added, so that in this environment of high blending temperature, the polyester Masterbatch originally having high crystallinity, will produce free radical cross linking reaction, to form Interpenetrating network structure (IPN), to increase the number of the non-fix type area, namely the non-crystalline area. Then, bake the light-storing masterbatch thus obtained, and test luminance of the light-storing masterbatch. Table 2 shows the test results, wherein, due to the increase of the cross linked structure, the non-crystalline area is increased. For the composite light-storing powder in the polyester structure, since the crystalline area could reduce light scattering, such that the luminance of the light-storing masterbatch will increase due to the increase of the cross linked structure. In addition, the viscosity of the light-storing masterbatch is increased from 0.6 to 0.9, that is very beneficial to the subsequent spinning process. Since in case the viscosity of the light-storing masterbatch is to low, then filaments can not be formed. The remarkable luminance of the light-storing masterbatch can not only increase the applicability of its product in the future, but it can also reduce the amount of the composite light-storing powder utilized in achieving cost reduction.

TABLE 1

| | ring structure test agent (wt %) 3-[(4-Nitrophenyl)azo]-5-[(4-sodio sulfophenyl)azo]-2-hydroxybenzoic acid sodium salt | organic compound having double-imide-bond steric structure (wt %) 4,4'-Diamino-2,2'-stilbenedisulfonic acid | ring structure test agent (wt %) Trially amine | thermo-plastic polymer (wt %) PBT | light-storing material (wt %) $MAl_2O_4$: Eu, N | dispersive agent (wt %) wax | cross linking agent (wt %) light sensitive cross linking agent |
|---|---|---|---|---|---|---|---|
| comparison example | 0 | 0 | 1.5 | 80.4 | 18 | 0.1 | 0 |
| Embodiment 1 | 0.1 | 0 | 1.5 | 80.3 | 18 | 0.1 | 1.0 |
| Embodiment 2 | 0.1 | 0.05 | 1.5 | 80.25 | 18 | 0.1 | 1.5 |
| Embodiment 3 | 0.1 | 0.1 | 1.5 | 80.25 | 18 | 0.1 | 2.0 |

TABLE 2

| | (Intrinsic viscosity, I.V.) of light-storing masterbatch | luminance after light emission 2 minutes (mcd/m$^2$) | afterglow duration (min) |
|---|---|---|---|
| composite light-storing powder | — | 1288 | 3509 |
| comparison example | 0.6 | 598 | 1823 |
| Embodiment 1 | 0.82 | 1108 | 3523 |
| Embodiment 2 | 0.89 | 1193 | 3581 |
| Embodiment 3 | 0.88 | 1243 | 3760 |

3. Light-Storing Fiber

Continue the manufacturing process mentioned above, a composite spinning and curling machine is used to perform spinning of the light-storing masterbatch, in a spinning temperature of 230 to 290° C. In the present invention, since the light-storing masterbatch is provided with the cross linking structure of Interpenetrating Network Structure (IPN), the viscosity of light-storing masterbatch can reach over 0.8, and its heat resistance is raised. Therefore, the spinning temperature of the spinning process can be raised, and the higher the temperature the higher its fluidity, to increase the production speed and reduce the cost. Moreover, the filament curling speed can reach 1000 to 3000 m/min due to increase of fluidity of the light-storing masterbatch; while the thickness of the fiber can be reduced from 6 DPF to 120 D/36 F, that is about 3 DPF (thickness of each fiber), as shown in the test results of Table 3. In Table 3, it shows that, the present invention indeed can produce multi-wavelength light-storing fiber as required, and after test wash (AATCC135 test method) with water 50 times, luminance of fiber can be maintained at 80 to 120 mcd/m$^2$.

Figure 4:
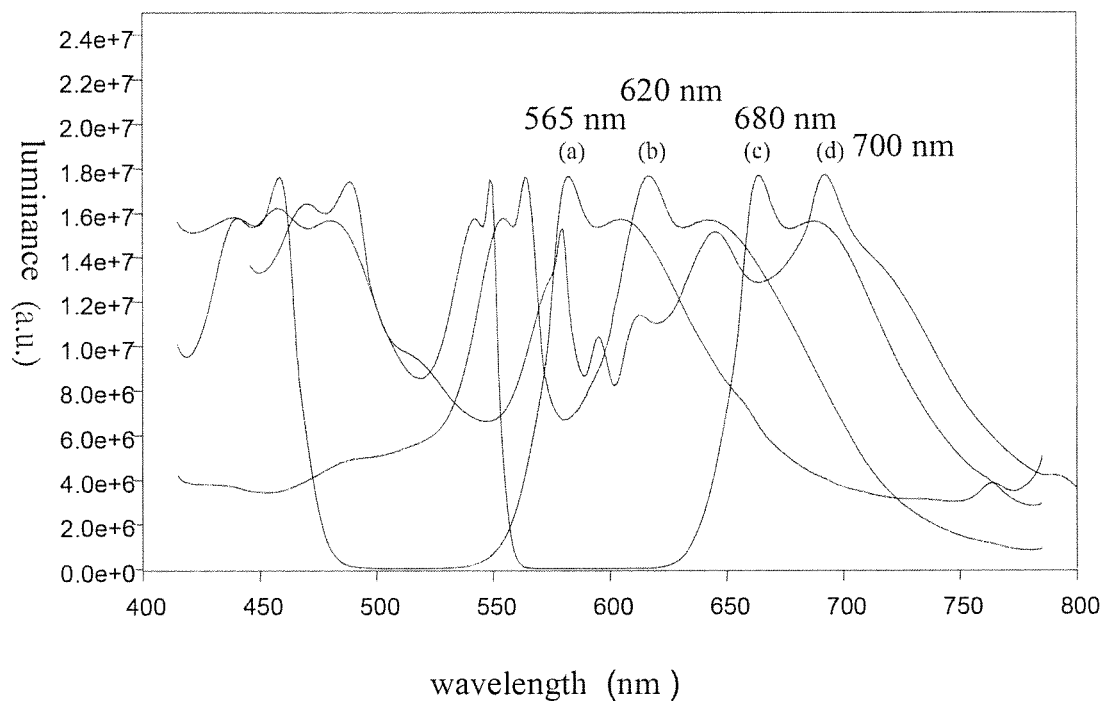
FIG. 4 is a diagram showing light spectrum energy distribution curves for a comparison example and embodiments 1 to 3 according to the present invention.

Meanwhile, refer to FIG. 4 for a diagram showing light spectrum energy distribution curves for a comparison example and embodiments 1 to 3 according to the present invention. As shown in FIG. 4, curves (a), (b), (c), (d) represent respectively the light spectrum energy distribution curves for the light-storing fibers of a comparison example and embodiments 1 to 3. The result indicates that, in the embodiments of the present invention, the peak of light wavelength emitted by the multi-wavelength composite light-storing powder is shifted from the green light wavelength 565 nm (curve (a)) of the light-storing material of the comparison example, to the yellow light wavelength 620 nm (curve (b)), the orange light wavelength 680 nm (curve (c)), and the pink light wavelength 700 nm (curve (d)).

TABLE 3

|  | fiber strength (g/d, %) | luminance before water wash (mcd/m$^2$) | luminance after water wash 50 times (mcd/m$^2$) | light wavelength (nm) |
|---|---|---|---|---|
| comparison example | 1.5 | 120 | 120 | 565 |
| Embodiment 1 | 1.6 | 90 | 90 | 620 |
| Embodiment 2 | 1.7 | 80 | 80 | 680 |
| Embodiment 3 | 1.8 | 60 | 60 | 700 |

Summing up the above, the present invention provides a multi-wavelength composite light-storing powder and method of manufacturing and applying the same. Wherein, organic compound having double-imide-bond steric structure and light-storing material containing rare earth elements are utilized, in an extremely low temperature and with a high temperature gas flow, to produce composite light-storing powder capable of emitting warm color series wavelengths. As such, it not only changes the light emitting characteristics of the light-storing material, but cracks will also not occur even below 400° C. The multi-wavelength composite light-storing powder is capable of emitting lights of different wavelengths at different times. The peak wavelength of lights emitted from the multi-wavelength composite light-storing powder can be changed from the original 565 nm (green light) of the prior art to 620 nm (yellow light), 680 nm (orange light), and 700 nm (pink light).

Moreover, for the multi-wavelength composite light-storing powder produced in the present invention, through the free radical cross linking reaction, plus chemical reaction agent having 2- or 3-function groups, it can produce large quantity of non-fixed areas. The double-imide-bond steric structure on the surface of the composite light-storing powder is apt to engaged with thermoplastic polymer cross linking structure in the high temperature process of masterbatch blending, to reduce the cracks of thermoplastic polymer incurred due to heat, so that the composite light-storing powder can be distributed evenly in the thermoplastic polymer. In addition, in the process of producing light-storing masterbatch, the amount utilized for light-storing material containing rare earth elements is only 8 to 20% by weight, thus reducing the production cost significantly.

For the reasons mentioned above, the light-storing fiber produced from light-storing masterbatch through the filament process is capable of emitting light wavelength of various colors. Also, its heat resistance, fiber strength, and resilience are increased. Since its luminance is raised, the amount of light-storing material utilized can be reduced. In addition, the Denier number and amount utilized for the light-storing fiber can be decreased, to maintain the visibility of 3 mcd/m$^2$ to the naked eyes for more than 3 hours.

Through the application of the present invention, the amount utilized for the light-storing material can be reduced, yet the luminance of the light-storing fiber produced can be raised, to achieve multi-color light emission and long term wash endurance. Therefore, it has a promising future, and can be utilized in various Industries, such as such as the commodity industry, textile industry, indoor decoration products, and safety products.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A multi-wavelength composite light-storing powder manufacturing method, comprising following steps: providing a light-storing material containing rare earth elements, and an organic compound having double-imide-bond steric structure; introducing in a high speed gas flow, to an environment of temperature −100 to −196.degree. C., to make said light-storing material containing rare earth elements, and said organic compound having said double-imide-bond steric structure to produce high speed collision, so that said organic compound having said double-imide-bond steric structure forms and fuses onto a surface of said light-storing material containing rare earth elements, to produce said multi-wavelength composite light-storing powder.

2. The multi-wavelength composite light-storing powder manufacturing method as claimed in claim 1, wherein said high speed gas flow is a nitrogen gas flow.

3. The multi-wavelength composite light-storing powder manufacturing method as claimed in claim 1, wherein said organic compound having said double-imide-bond steric structure is present in an amount by weight of 0.01 to 5%.

4. The multi-wavelength composite light-storing powder manufacturing method as claimed in claim 1, wherein said organic compound having said double-imide-bond steric structure is 4,4'-diamino-2,2'-stilbenedisulfonic acid.

* * * * *